March 29, 1966  H. L. KELLING  3,243,057
METHOD AND MEANS FOR UNLOADING A GRAIN STORAGE CHAMBER
Filed Nov. 29, 1963

INVENTOR
HAROLD L. KELLING
BY Dick + Zarley
ATTORNEYS

United States Patent Office 3,243,057
Patented Mar. 29, 1966

3,243,057
METHOD AND MEANS FOR UNLOADING A
GRAIN STORAGE CHAMBER
Harold L. Kelling, 1904½ Summit,
Marshalltown, Iowa
Filed Nov. 29, 1963, Ser. No. 326,721
5 Claims. (Cl. 214—17)

This invention relates to a method and a means for unloading a grainery truck or a grain storage bin or the like.

The unloading of grain trucks at grain elevators or the like may be handled in a number of ways. The most primitive of all is to manually scoop the grain out of the truck. Later, mechanical hoists were developed for raising one end of the truck to cause the grain to move by gravity to the opposite open end. In recent years, complicated expensive automatic conveyor systems have been developed as optional equipment for trucks which eliminates the need for the hoist means.

Even with these methods being available, it is still impractical in many instances because of the cost involved or for other reasons to employ the hoist or automatic conveyor means. Therefore, it is one of the objects of this invention to provide a method and means for removing that portion of the grain from the truck which remains after passageways in the floor of the truck have been opened. Normally these passageways are uniformly spaced along the length of the truck and in addition the rear end of the truck will be opened for the grain to flow into a ground chamber or elevator system. No matter how the passageways or openings in the bottom of the truck are spaced there will always be a certain amount of grain which will not reach the outlet openings if reliance is solely made upon the forces of gravity. Heretofore, the grain to the sides of these floor openings would be moved by scoop shovels manually into the openings. This, of course, required considerable time and much manual labor.

It is contemplated that by this invention, the manual conveyor means may be positioned with its discharge end in communication with one of the floor openings in the truck and the operator will walk in a circular path around the opening thereby scooping up all of the grain and transferring it to the floor opening.

It is a further object of this invention that the grain conveyor means shall be of such a length that it will at least extend from the floor opening to the adjacent sides of the truck.

It is a further object of this invention that the conveyor means will have a length sufficient to move closely adjacent to the next discharge opening in the truck floor in order to maximize the floor area covered by the circular travel of the conveyor means about the respective openings. Consequently, there will be a certain amount of overlapping between adjacent circular paths made around adjacent discharge floor openings.

It is a further object of this invention to provide a manually operated grain conveyor having a blade for slidably scooping up grain for transfer to floor outlet openings by an auger means.

It is a still further object of this invention to provide a grain conveyor means wherein an auger is rotatably mounted on one side of a shovel blade and a power means is pivotally connected to the other side for driving the auger means.

It is a still further object of this invention to provide a grain shovel conveyor means which moves grain laterally of the line of travel of the forward movement of the grain conveyor means.

Another object of this invention is to provide a manually operated grain conveyor means in which the grain may be transferred laterally in either direction from the machine as it moves forwardly.

A further object of this invention is to provide a method and means for unloading a grain storage chamber, which is simple in design, economical to manufacture and refined in appearance.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a top plan view of a grain truck having a plurality of longitudinally spaced discharge openings which have been opened but leaving grain therebetween. Additionally, the grain conveyor means of this invention is shown in operation moving around one of the discharge openings in the floor of the truck to remove the grain, which did not fall by gravity from the truck, through an adjacent opening.

Figure 1:
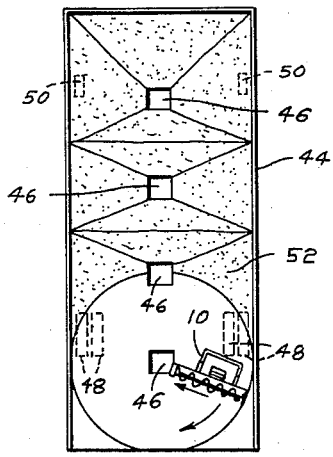
Figure 2:
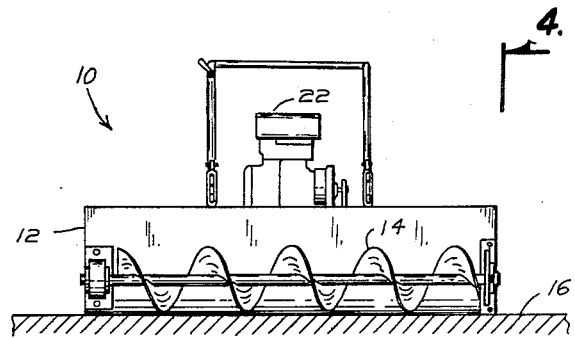
FIG. 2 is a front elevation view of the manually operated grain conveyor means.
Figure 4:
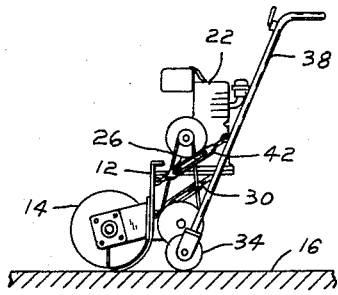
FIG. 4 is a side elevation view of the grain conveyor means.

The grain conveyor unit of this invention is referred to generally by the reference numeral 10 in FIG. 1. It is shown to comprise an elongated upstanding arcuate shovel blade 12 having a lower longitudinal edge adapted to slidably engage a floor surface. On the forward concave side of the blade 12 is an auger 14 rotatably connected at its opposite ends to the blade 12 at its opposite ends. The auger 14 is positioned as shown in FIG. 4 at approximately one-quarter of an inch above the floor surface 16.

Figure 3:
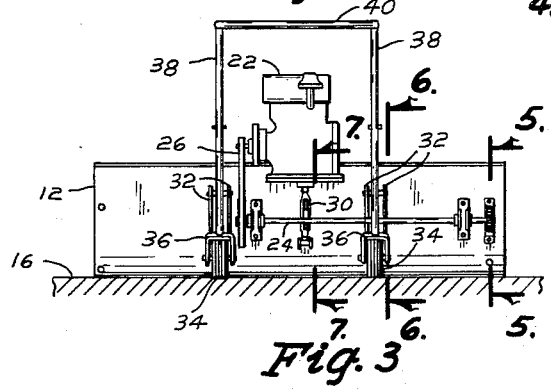
FIG. 3 is a rear elevation view of the grain conveyor means.
Figure 5:
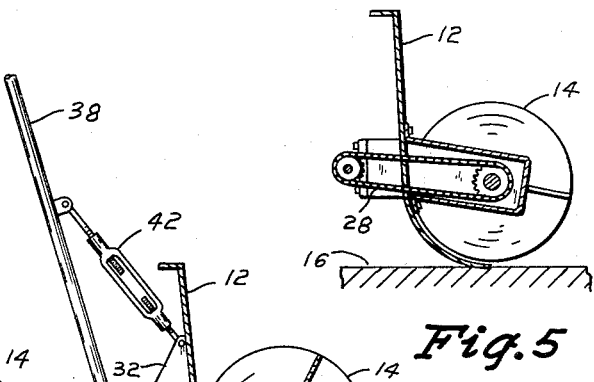
FIG. 5 is a cross-sectional elevational view taken along line 5—5 of the grain conveyor means showing in particular the gear train for operating the auger.

On the rear side of the shovel blade 12, a platform 18 is pivotally connected at 20 adjacent the upper longitudinal center portion of the shovel blade. An engine 22 is bolted to the platform 18. As seen in FIG. 3 a drive shaft 24 extends horizontally along the rear side of the blade 12 and is coupled by a belt 26 to the engine 22. The other end of the drive shaft 24 is coupled by a belt or chain 28 through the shovel blade 12 to a sprocket on one end of the auger 14 (FIG. 5).

At the outer free end of the support plate 18, a turn buckle 30 is pivotally connected and extends downwardly where it is pivotally connected at its other end to the shovel blade 12. Thus, it is seen that the tension in the belt 26 driving the shaft 24 may be increased by extending the turn buckle 24 to raise the engine 22 above the drive shaft 24.

Figures 6, 7:
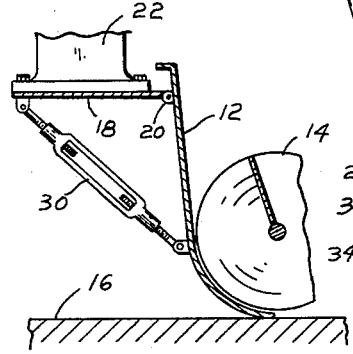
FIG. 6 is a cross-sectional elevational view taken along line 6—6 in FIG. 3.
FIG. 7 is an enlarged side elevation view of the adjustable engine support means.

Also secured to the rear surface of the blade 12 are two pairs of vertically extending plates 32. Between the lower ends of each of the pairs of plates 32, a wheel 34 is provided. The axle for connecting the wheel 34 to the plates 32 is also pivotally connected to a U-shaped bracket 36. The two U-shaped brackets 36 are in turn coupled by upwardly and rearwardly extending members 38 which are joined by a horizontal handle portion 40. Intermediate the length of each of the upstanding handle members 38, a turn buckle 42 is pivotally connected which extends to a pivotal connection with the upper ends of the spaced apart plates 32 (FIG. 6). Accordingly, the rearward and upward angle of the handle members 38 may be readily adjusted by extending or shortening the turn buckles 42.

In FIG. 1, semi truck 44 is shown having a plurality of spaced apart floor discharge openings 46 disposed on a center longitudinal line extending the length of the truck. Ground support tandem wheels 48 are provided at the rear of the truck and single wheels 50 at the front end of the trailer portion of the truck. In operation, the passageways 46 through the floor have been opened and all of the grain 52 in the immediate area above the passageways has fallen by gravity from the truck. However, as shown in FIG. 1, considerable grain remains on the floor 16 between the floor openings 46 and between the openings and the truck sidewalls. Additionally, at the rear end of the truck a discharge opening is provided (not illustrated) which would be used. Thereupon, however, the grain conveyor unit 10 is placed in the truck with its discharge end in communication with the floor openings 46. The operator of the unit 10 then walks in a circular path around the openings 46 whereby the grain in the path of the unit 10 is scooped up by the blade 12 and conveyed by the auger 14 into the discharge floor openings 46. After the grain discharge opening 46 closest to the rear end of the truck has been circled by the unit 10, the operator moves to the next opening 46 toward the front end of the truck 44 and similarly pushes the conveyor unit 10 in a circular path thereabound. As illustrated, the openings 46 are spaced at such a distance that portions of the circular paths of the grain conveyor unit 10 overlap each other. Thus, the operator moves from the opening 46 adjacent the rear end of the truck to each of the successive openings 46 and performs the same operation.

It is seen then that by first removing the grain at the rear end of the truck by opening the rear end gate, space is provided for entry of the grain conveyor unit 10 and, since the grain in the immediate area of the first floor opening 46 has been removed, the conveyor unit 10 may be placed with its discharge end in communication with the floor opening ready for the operator to begin the final unloading operation. In cleaning the grain from the first opening 46 and area is cleared for moving to the next opening 46 and so on until the entire truck has been completely emptied.

It is to be understood that the scope of this invention of a method and means for unloading storage chambers is applicable to all types of material which is free flowing such as bulk feed, fertilizer or the like and is not to be limited to grain alone.

Some changes may be made in the construction and arrangement of my method and means for unloading a grain storage chamber without departing from the real spirit and purpose of my invention, and it is my intention to cover by my claims, any modified forms of structure or use of mechanical equivalents which may be reasonably included within their scope.

I claim:
1. In a grain storage and unloading system, comprising, a storage chamber having a floor provided with a plurality of discharge openings extending therethrough, said openings being spaced along the length of said floor,
an elongated portable conveyor discharge unit having a discharge end and said conveyor having a length equal to at least the distance between adjacent discharge openings, and
said portable conveyor adapted to be successively positioned with said discharge end in communication with each of said discharge openings and moved around said discharge openings for transfer of all of the grain in the path of said unit to the respective discharge openings, said portable conveyor when positioned at the second and successive discharge openings being disposed in the circular path around the precedent discharge opening.

2. In a grain storage and unloading system, comprising, a storage chamber having a floor provided with a plurality of discharge openings extending therethrough, said openings being spaced substantial and equal distance apart along the length of said floor,
an elongated portable conveyor discharge unit comprising a frame, an elongated upstanding blade secured thereto and adapted to engage the floor along one of its longitudinal edges, an auger means extending adjacent and parallel to said blade and being secured to said frame, said auger having a discharge end adjacent one end of said blade, said blades and auger being substantially equal in length to the distance between adjacent discharge openings, and
said portable conveyor adapted to be positioned with said discharge end of said auger in communication with each of said discharge openings and manually moved around said discharge opening for transfer of grain in the path of said blade to the respective discharge opening.

3. A portable grain material conveyor unit, comprising,
a frame mounted on wheel means,
a handle means extending from one end of said frame for manually moving said unit,
an upstanding blade extending laterally of the other end of said frame, said blade having a lower edge adapted to slidably engage the floor surface of a grain storage chamber,
a rotatable auger mounted on said frame forwardly of said blade and parallel thereto,
means carried on said frame for rotating said auger for movement of grain collected by said blade to one lateral side of said unit, and
said wheel means being rotatable about an axis parallel to the axis of rotation of said auger and said wheel means being disposed on the opposite side of said blade from said auger.

4. a portable grain material conveyor unit, comprising,
a frame mounted on wheel means,
a handle means extending from one end of said frame for manually moving said unit,
an upstanding blade extending laterally of the other end of said frame, said blade having a lower edge adapted to slidably engage the floor surface of a grain storage chamber,
a rotatable auger mounted on said frame forwardly of said blade and parallel thereto,
said wheel means being rotatable about an axis parallel to the axis of rotation of said auger and said wheel means being disposed on the opposite side of said blade from said auger,
a power means pivotally secured along one end to the rear side of said blade,
an adjustable support means secured at one end to said other end of said power means and the other end of said support means being secured to said blade,
an endless belt means operatively coupling said power means to said auger for rotation thereof to move grain collected by said blade to one lateral side of said unit, and
said adjustable support means adapted to be extended to raise the other end of said power means and tighten said endless belt.

5. A portable grain material conveyor unit, comprising,
an elongated upstanding blade being arcuate in transverse cross-section, the blade having a lower longitudinal edge adapted to slidably bear against the floor of a feed chamber,
a handle means extending from the convex rear side of said blade for manually moving said blade,
wheel means rotatably secured to said blade, a rotatable auger mounted on the concave forward side of said blade opposite said handle and said wheel means, said auger extending parallel and closely adjacent to said concave side and rotatable about an axis parallel to the axis of rotation of said wheel means, a power means pivotally secured along one end to the rear side of said blade, an adjustable support means secured at one end to said other end of said power means and the other end of said support means being secured to said blade, an endless belt means operatively coupling said power means to said auger for rotation thereof to move grain collected by said blade to one lateral side of said unit, and said adjustable support means adapted to be extended to raise the other end of said power means and tighten said endless belt.

References Cited by the Examiner

UNITED STATES PATENTS

| | | | |
|---|---|---|---|
| 1,482,524 | 2/1924 | Robinson | 214—17.82 |
| 2,816,804 | 12/1957 | Harver | 214—17.84 |
| 3,017,045 | 1/1962 | Soehl | 214—17.84 |

EVON C. BLUNK, *Primary Examiner.*

RICHARD E. AEGERTER, SAMUEL F. COLEMAN,
*Examiners.*